INVENTOR
André Malicheff

INVENTOR
André Malicheff
BY Spencer & Kaye
ATTORNEYS

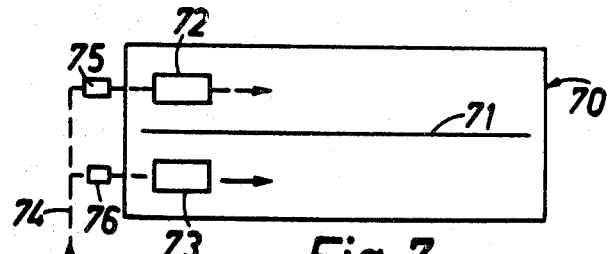
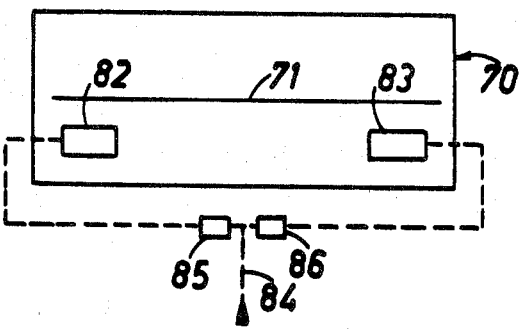
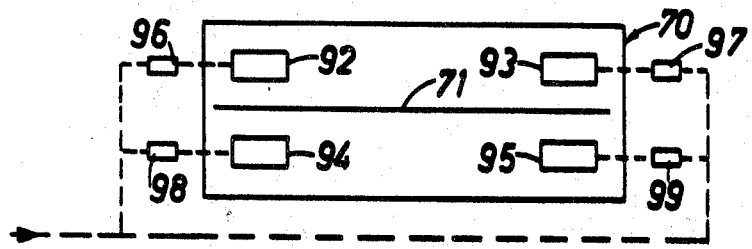

3,533,250
METHOD AND APPARATUS FOR THE
DRAWING OF FLAT GLASS
André Malicheff, Lissewege, Belgium, assignor to
Glaverbel S.A., Watermael-Boitsfort, Belgium
Filed Jan. 30, 1968, Ser. No. 701,669
Claims priority, application Luxembourg, Feb. 14, 1967,
52,993
Int. Cl. C03b 15/04
U.S. Cl. 65—84
11 Claims

ABSTRACT OF THE DISCLOSURE

A method and apparatus for improving the quality of a drawn flat glass ribbon comprises continuously imparting on at least one side of the ribbon at least several to-and-fro reversals per minute to the movement of the atmosphere in the drawing chamber in a direction transverse to the ribbon drawing direction.

BACKGROUND OF THE INVENTION

The present invention relates to a method of, and apparatus for, manufacturing glass sheets, particularly by drawing a continuous glass ribbon, or strip, from a bath of molten glass and through a drawing chamber.

Although many methods are already known for vertically drawing such a strip, it has been found to be difficult to produce sheets of glass free from surface deformations by such conventional methods. During manufacture according to these methods, it is found that the glass ribbon lacks uniform thickness over its whole width, certain places being too thick or too thin, and that the ribbon may have wrinkles. The result of such variations in thickness and lack of flatness is that the glass has optical defects which reduce its quality and limit its possible uses. These flaws appear in glass both drawn by the Pittsburgh method and obtained by the Colburn method, in which the glass is first drawn vertically and then bent over a roller to continue its movement horizontally.

The origin of these flaws is to be found in the currents circulating in the atmosphere of the drawing machine, which atmosphere is heated by contact with the bath of molten glass and the glass ribbon, and is therefore given an ascending movement along the ribbon. The current is most intense along the centerline of the ribbon and causes an inflow of gases from the ribbon edges.

These inflowing gases are cooler, since they have been in contact with the side walls of the drawing machine. Moreover, the inflow of these gases produces a circulation of cold descending currents along those side walls. The inflowing gases include atmospheric air which has been drawn into the machine. As a result of all of these currents, the temperature of the atmosphere in which the glass ribbon is immersed varies considerably across the width of the ribbon. This will cause some portions of the glass ribbon to be cooled more quickly than others by currents of different temperatures circulating along the ribbon surfaces, thus producing variations in thickness and optical deformations.

To obviate this disadvantage, it has already been suggested that the harmful currents existing at certain locations along the ribbon be eliminated and replaced by steady currents whose temperature can be controlled. Such currents are applied where the ribbon is in a temperature zone in which it is most sensitive to variations in the temperature of the surrounding atmosphere.

To this end, coolers are specially constructed and disposed very close to the ribbon so as to intercept the normally present ascending currents. The coolers are formed with a series of apertures which extend across the whole width of the glass ribbon and via which gases are injected, which gases are subsequently drawn off through another series of apertures. The injected gases produce, on each surface of the glass ribbon, a descending current of gas which contacts the surface of the glass over the whole width of the ribbon and whose temperature is accurately controlled. This descending current thus produces unvarying treatment conditions.

The above method has a number of disadvantages. Firstly, the very fact that the coolers are disposed very close to the surfaces of the glass ribbon represents a factor contributing towards the deterioration of the surface quality of the glass. In effect, the coolers provided for interrupting the ascending currents are subjected to thermal stresses which deform them to a greater or lesser degree, so that the coolers then effect a nonuniform cooling of the ribbon. This effect becomes more pronounced the nearer the coolers are disposed to the glass ribbon.

Secondly, even if the coolers are placed as close as possible to the ribbon, they can not completely interrupt the ascending currents. The latter can always pass between the ribbon and the coolers and become mixed with the descending currents set up at that level. The thermal homogeneity of such descending currents is therefore a matter of chance.

Moreover, the usual steady current conditions still exist between the surface of the bath of molten glass and the cooler, and these currents can still act on the surface of the ribbon.

This method, although the most effective heretofore proposed, is therefore inadequate for obviating or correcting variations in thickness in a drawn ribbon of glass.

SUMMARY OF THE INVENTION

It is a primary object of the present invention to overcome these drawbacks and difficulties.

Another object of the invention is to substantially improve the surface quality of drawn glass.

A further object of the invention is to substantially eliminate the adverse effects of nonuniform air currents on the surface quality of a glass ribbon as it is drawn through a drawing chamber.

Still another object of the invention is to produce a drawn glass ribbon having a nearly perfectly uniform thickness.

These and other objects according to the invention are achieved, in a method for manufacturing sheet glass by drawing a glass ribbon from a molten glass bath in a drawing chamber, by the improvement of producing to-and-fro movements of the atmosphere in at least a portion of the drawing chamber in a direction transverse to the ribbon drawing direction.

The objects according to the invention are also achieved, in apparatus including a drawing chamber and means for manufacturing sheet glass by drawing a glass ribbon from a molten glass bath in the drawing chamber, by the improvement including means associated with the chamber for producing to-and-fro movements of the atmosphere in at least a portion of the drawing chamber in a direction transverse to the ribbon drawing direction.

It has surprisingly been found that the result of this step is a considerable improvement in ribbon surface quality, as regards variations in thickness. It is believed that this is due to the fact that the to-and-fro motion prevents the establishment of ascending currents along the ribbon having unequal temperatures. The to-and-fro motions produce, in the drawing chamber, a completely agitated, or turbulent, atmosphere whose effect is less harmful than that of any natural or artificially produced steady currents which might be present in the drawing chamber. The whole of the atmosphere in the chamber still undergoes an ascending movement but no longer presents current threads, or narrow streams, which follow preferential paths along the ribbon. The to-and-fro motion prevents such currents from being set up.

The substantial improvement achieved by the present invention is all the more surprising when it is realized that the technique employed bears practically no similarity to the solutions previously suggested for eliminating or minimizing such defects.

To produce the desired effect, the frequency of the to-and-fro motion must be sufficiently high, i.e., of the order of several movements per minute, or else the steady currents will have time to become reestablished, an occurrence which must be avoided.

Preferably, the to-and-fro motions are produced parallel to the surfaces of the ribbon and in a substantially horizontal direction, so as to obtain a maximum effect.

It has been found that, during the drawing of the glass ribbon, the ascending currents circulating along the ribbon are cooler and have less thermal homogeneity at the side of the drawing chamber which is downstream of the region from which molten glass is supplied than at the side to which fresh molten glass is supplied. These currents at the downstream side therefore have a more marked action than those circulating at the upstream side of the ribbon. The surface quality of the ribbon can therefore be most effectively corrected by taking action on the portion of the atmosphere downstream of the ribbon by causing such to-and-fro motions to be given to at least one portion of the atmosphere between the glass ribbon and the transverse walls bounding the drawing chamber at the side of the chamber opposite the side to which fresh molten glass is delivered. In some cases, when the action producing this to-and-fro motion is large enough, such motion can be partly transmitted, around the ribbon edges, to the atmosphere in the drawing chamber upstream of the drawn ribbon to act on the ascending currents in that part of the chamber.

To obtain the required effectiveness over the whole width of the drawn ribbon, when a single member produces movement in both directions, the member producing the to-and-fro motions is centered with respect to the glass ribbon. In another embodiment, the member producing a to-and-fro motion consists of two identical elements which are disposed adjacent the same edge of the glass ribbon and each on a respective side thereof, and which act alternatingly to produce movement in the same direction. This embodiment requires a fairly high injected gas pressure or fan speed to ensure a sufficient to-and-fro motion acting on both sides of the glass ribbon.

When the members producing the to-and-fro motions are disposed on opposite sides of the ribbon, they advantageously consist of two identical pairs of elements, each pair being disposed adjacent a different edge of the ribbon. As regards operation, the elements situated adjacent the same edge can act simultaneously in the same direction and in alternation with the elements disposed adjacent the other edge. Alternatively, the diagonally opposite elements can act simultaneously in opposite directions and in alternation with the other set of diagonally opposite elements. In the latter instance, the to-and-fro motions have a greater amplitude than in the former instance, since the actions of the various elements are additive.

Between these two possibilities, the amplitude of the to-and-fro motions of the atmosphere can be modified by operating each of the various elements successively, in a determined cycle. The cycle can be modified during manufacture of the ribbon in response to the circumstances affecting the latter.

If action is taken only on the atmosphere on one side of the ribbon, the member producing the to-and-fro motions advantageously comprises two identical elements which are each disposed adjacent a different edge of the glass ribbon and which act alternatingly in opposite directions.

The statement that an element is disposed adjacent an edge of the ribbon means that the element is disposed opposite an edge portion extending over one-third of the ribbon width, or is disposed beyond the edge of the ribbon.

The elements can be fans or ejectors each producing movement in one direction.

BRIEF DESCRIPTION OF THE DRAWINGS

FIG. 7 is a schematic plan view illustrating a further embodiment of the invention.

FIG. 8 is a view similar to that of FIG. 7 of yet another embodiment of the invention.

FIG. 9 is a view similar to that of FIG. 7 of still another embodiment of the invention.

DESCRIPTION OF THE PREFERRED EMBODIMENTS

Figure 1:
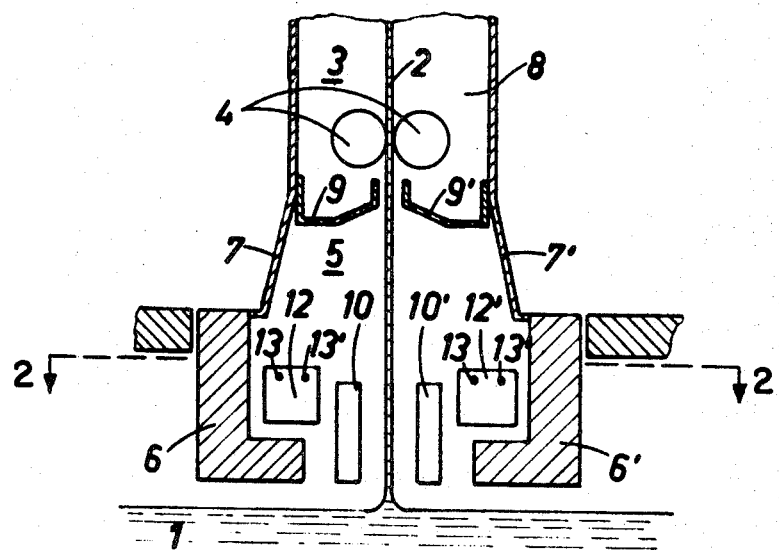
FIG. 1 is an elevational, cross-sectional view along the line 1—1 of FIG. 2, of a drawing chamber provided with one embodiment of the present invention.

The following description relates to merely a few non-limitative exemplary embodiments of the invention.

In one embodiment of the invention, the to-and-fro motions are given to portions of the atmosphere in the drawing chamber on both sides of the glass ribbon. In such case, the to-and-fro motions on both sides of the ribbon can either be in phase, i.e., both can be in the same direction at any instant, or out of phase, i.e., in respectively opposite directions at each instant. In the latter case, the motions of the atmosphere downstream are partly transmitted to the atmosphere upstream of the ribbon, and vice versa.

The to-and-fro motions given to the portions of the atmosphere on either side of the glass ribbon can be produced simultaneously or alternatingly. In dependence on the method employed, the transmission of motion from one side of the ribbon to the other will vary in amount.

Mechanical means can be used to produce the to-and-fro motions, or they can be produced by a gas at a pressure higher than that in the drawing chamber which is injected intermittently into the chamber. The latter method is particularly advantageous since it eliminates the use of devices having moving members and hence requiring supervision and constant maintenance due to the fact that such devices must operate in surroundings at a fairly high temperature.

To avoid the introduction of cold air into the drawing machine, the motion-producing gases are heated before injection. This can be accomplished by a heat exchange with the atmosphere in at least one drawing machine. Alternatively, gas can be taken from the atmosphere within the glass-melting tank for injection into the drawing chamber.

The invention also relates to an apparatus for the performance of the method defined hereinbefore. The device comprises at least one member producing a to-and-fro motion in a gaseous body, the member being disposed between at least one of the surfaces of the glass ribbon and a transverse wall bounding the drawing chamber.

In a first embodiment of the invention, at least one member producing the to-and-fro motions is disposed on each side of the glass ribbon.

In one modification according to the invention, a single member producing the to-and-fro motions is disposed between the glass ribbon and the transverse wall bounding the drawing chamber on the side opposite the side at which molten glass is delivered. This form of construction has the advantage that it requires very few component parts and yet is adequately effective.

Alternately, a single member can be disposed only on that side of the ribbon at which the molten glass is supplied. However, it has been found that this arrangement is not as efficient as the one described above.

In one specific embodiment of the invention, the member producing the to-and-fro motions is formed by at least one plate attached to at least one displacement member which imparts to it a to-and-fro motion, the plate being disposed substantially perpendicular to the glass ribbon. Preferably, the displacing member is formed by at least one wire which extends parallel with the ribbon over its whole width, one end of the wire being wound on a drum attached to a shaft which can be reversibly driven by a motor, while the other end of the wire is wound on an automatic return drum.

Figure 2:
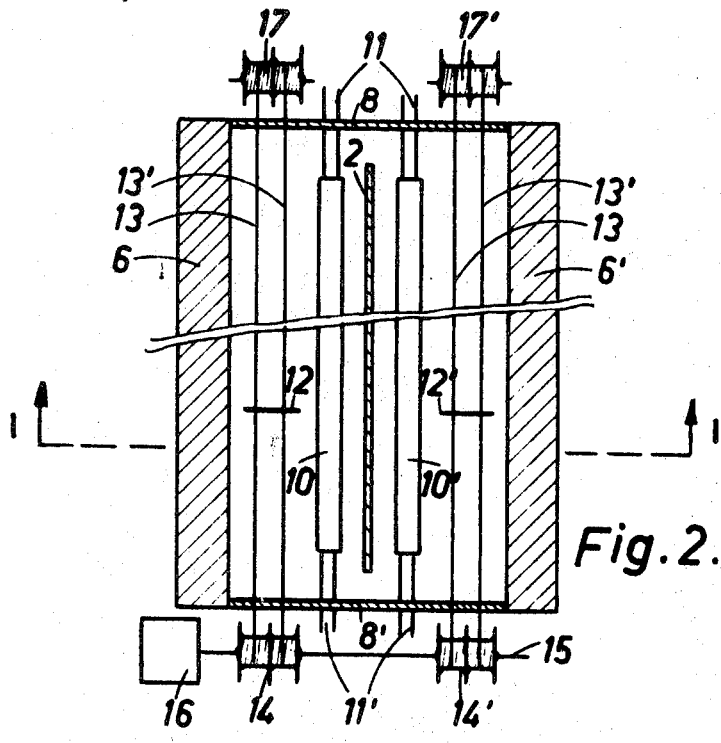
FIG. 2 is a cross-sectional, plan view taken along the line 2—2 of FIG. 1.

FIGS. 1 and 2 illustrate such an embodiment in a Pittsburgh type vertical drawing machine in which a glass ribbon 2 is drawn from a bath of molten glass 1. The ribbon is drawn up by a drawing machine 3 composed of a succession of pairs of rollers which bear against the glass, only one pair 4 of which is shown.

Disposed below the drawing machine 3 is a drawing chamber 5 which must be made as fluidtight as possible to create a zone presenting suitable temperature conditions for the formation of the glass ribbon. The drawing chamber 5 is bounded transversely by two L-shaped blocks 6 and 6', which extend very close to the surface of the bath of molten glass 1, and two walls 7 and 7' which connect the upper part of the L-shaped blocks to the base of the drawing machine 3. At its sides the drawing chamber 5 is closed by walls 8 and 8' which are normally thermally insulated.

At the top, the drawing chamber 5 is closed by catch pans 9 and 9' which also form the base of the drawing machine 3.

To ensure that the surfaces of the freshly drawn glass ribbon will be rapidly cooled, coolers 10 and 10' are usually disposed on either side of the ribbon 2. A cooling fluid, generally water, flows through the coolers 10 and 10', the coolant being supplied via tubes 11 and evacuated via tubes 11' which extend through the walls 8 and 8', respectively.

Along the two surfaces of the glass ribbon 2, ascending currents of hot gases appear. These currents originate when the atmosphere in the drawing chamber 5 is heated by thermal contact with the bath of molten glass 1 and the glass ribbon 2. Added to these currents are gas currents which come from the hot regions above the bath of the molten glass 1 outside the drawing chamber 5 and which are drawn under the L-shaped blocks into the chamber 5 as a result of the chimney effect produced by the drawing machine. The resulting combination of currents, which is thermally heterogeneous, passes along the ribbon 2 and mars its surface, causing variations in thickness as described hereinbefore.

To alternate the effect of these currents on the ribbon, plates 12 and 12' made of asbestos or heat-resistant metal are disposed in the drawing chamber 5 on either side of the ribbon and are oriented substantially perpendicular thereto, each plate being positioned between the vertical portion of a respective one of the L-shaped blocks 6 and 6' and an associated one of the coolers 10 and 10'.

Each of the plates 12 and 12' is attached to two heat-resistant steel cables 13 and 13' which extend parallel with the surfaces of the ribbon 2 and which pass through the side walls 8 and 8' of the drawing chamber 5.

At one of their ends, the cables 13 and 13' for each plate are wound on a respective one of the drums 14 and 14' attached to a common shaft 15 driven in rotation by a reversible electric motor 16 so that its direction of rotation is periodically reversed. The other ends of the cables 13 and 13' are wound on automatic return drums 17 and 17'. The automatic return rotation of the drums can be performed by a system of counterweights or springs (not shown).

The operation of the motor 16 is so controlled by a timing mechanism (not shown) that the reciprocatory movement of the plates 12 and 12' will occurs at a rate of between 5 and 10 cycles per minute. The total amplitude of the movement is preferably about one-third of the width of the glass ribbon 2. The excursion of each plate is symmetrical about the centerline of the ribbon 2.

When such an arrangement is used, it has been found that the resulting glass ribbon has a much more regular thickness and that the difference between the maximum and minimum thicknesses of the ribbon is greatly reduced in comparison with glass which is drawn without the use of the apparatus according to the invention.

The frequency and amplitude of the reciprocations of the plates 12 and 12' stated hereinbefore are not the only possible ones, but vary with the configuration and size of the drawing chamber.

Instead of having only one plate on each side of the ribbon, a number of plates can be used attached to the same set of wires.

Figure 3:
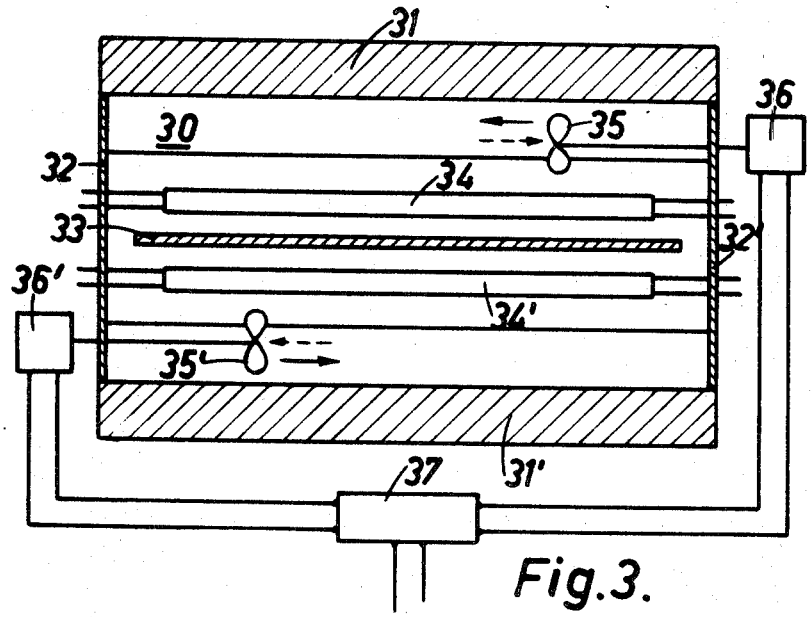
FIG. 3 is a cross-sectional view similar to that of FIG. 2, through a drawing chamber having another embodiment of the invention.

FIG. 3 is a cross-sectional plan view showing another embodiment of the invention disposed in a drawing chamber 30. The drawing chamber 30 is bounded transversely by L-shaped blocks 31 and 31', and laterally by side walls 32 and 32', as in FIG. 2. Coolers 34 and 34' are disposed on either side of a glass ribbon 33.

In this embodiment the members producing the two-and-fro movements are fans 35 and 35' disposed on either side of the ribbon adjacent its edges. The fans 35 and 35' are driven reversibly by electric motors 36 and 36', respectively, fed via a reversing switch 37 controlled by a timing mechanism (not shown).

In operation, the motors 36 and 36' are so fed during a first period that the two fans 35 and 35' are each rotated so as to simultaneously produce motions of the atmosphere in respectively opposite directions, as shown by the solid-line arrows. During a second period, after the switch 37 has been actuated by the timing mechanism, the fans 35 and 35' are each reversed so as to reverse the direction of the movement which each produces in the atmosphere as shown by the broken-line arrows.

The direction of rotation of the fans is preferably reversed 10 to 15 times per minute.

The action of the fans, when they are operated in the above-described way, gives the atmosphere in the drawing chamber a to-and-fro motion which is sufficiently pronounced to cause gases on each side of the ribbon to pass around its edges.

The motion thus set up is relatively substantial, but this need not necessarily be the case. If a lesser motion would suffice to correct surface faults, the fans 35 and 35' can be controlled according to a determined cycle to operate sequentially instead of simultaneously. In further accordance with the invention, it would also be possible to use a single reversible fan disposed along the median plane of the ribbon.

One possible cycle would be to run the motor 36 for 5 seconds, so that the motion produced by the fan 35 occurs in the direction indicated by the solid-line arrow, whereafter the motor 36' is run for 5 seconds to produce a current of gas in the direction indicated by the solid-line arrow, and then the motors 36 and 36' are run in succession for periods of 5 seconds each to produce currents in the directions indicated by the broken-line arrows.

In another embodiment, the member producing the to-and-fro movement is formed by a double-nozzle ejector which can blow gas in two directions. Preferably, in this case, the double ejector is formed by a T-shaped member whose two horizontal arms are formed by tubes each enclosed at its end remote from the vertical arm of the T-shaped member by a sleeve whose inside dimensions are greater than the outside dimensions of the horizontal arm, the vertical arm of the T-shaped member forming the support of the double-nozzle ejector.

This apparatus has the advantage that it is of very simple construction and is very robust, so that it can readily withstand the elevated temperatures in the drawing chamber. Preferably, the support of the double-nozzle ejector is formed by two tubes each supplying gas to one horizontal arm of the T-shaped member.

Figure 4:
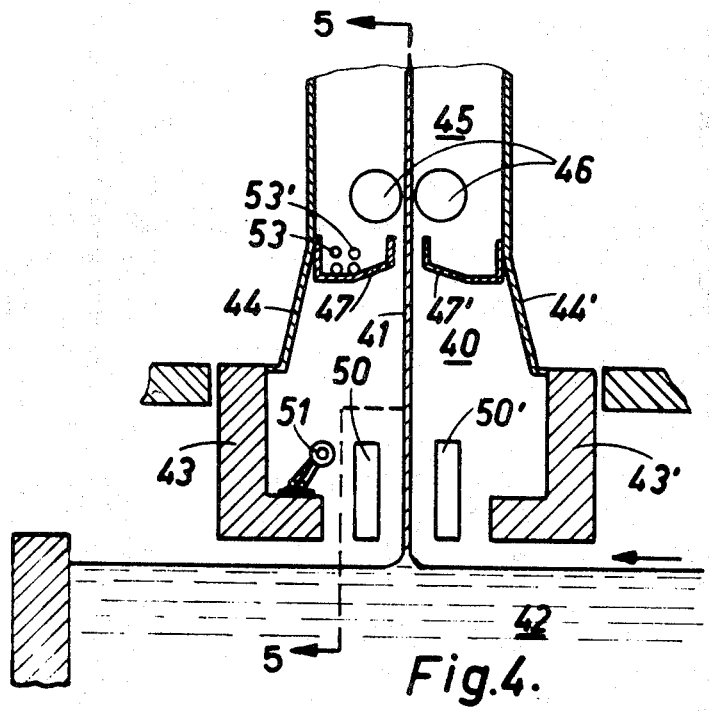
FIG. 4 is a cross-sectional view similar to that of FIG. 1 of a drawing chamber having another embodiment of the invention.
Figure 5:
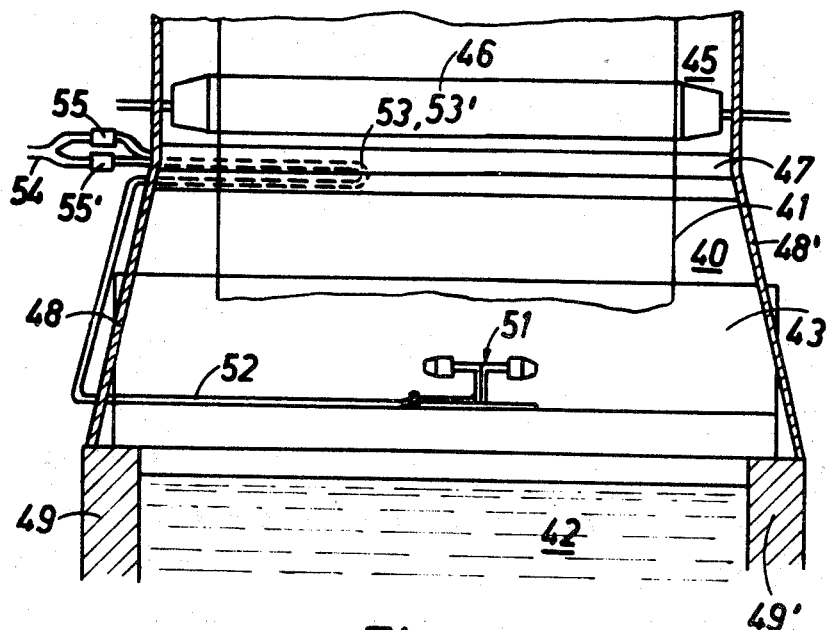
FIG. 5 is an elevational, cross-sectional view along the line 5—5 of FIG. 4.

FIGS. 4 and 5 show the utilization of such an embodiment of the invention to improve the surface of a glass ribbon produced by the Pittsburgh vertical drawing process. As in the embodiment shown in FIG. 1, a drawing chamber 40, in which a glass ribbon 41 is drawn from a bath of molten glass 42, is bounded transversely by L-shaped blocks 43 and 43' and walls 44 and 44' connecting the top part of the L-shaped blocks to a drawing machine 45. Only one pair 46 of the drawing machine rollers is shown. The top of the drawing chamber 40 is closed by catch pans 47 and 47'. At the sides, the drawing chamber 40 is closed by walls 48 and 48' (FIG. 5) which extend between the top edge of walls 49 and 49' of the container for the molten glass bath 42 and the base of the drawing machine 45. Coolers 50 and 50' are shown diagrammatically.

Figure 6:
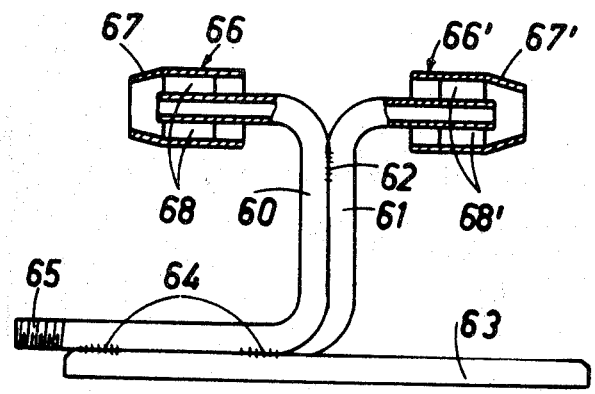
FIG. 6 is an elevational view, partly in cross section, of one component of the embodiment of FIGS. 4 and 5.

In accordance with the invention, a two-way double ejector 51, shown in greater detail in FIG. 6, is disposed in the part of the drawing chamber 40 situated on the side opposite the side where the molten glass is supplied to the drawing kiln.

As shown in FIG. 6, the ejector comprises a T-shaped member formed by two tubes 60 and 61 whose ends are bent at 90° to form the two horizontal arms of the T. The tubes 60 and 61 are attached to one another by a weld 62. The other ends of the tubes 60 and 61 are also bent at 90°, but in the same direction, and are disposed side by side on a supporting plate 63 to which they are attached by a weld 64. These other tube ends are screw-threaded, as shown at 65, to enable the ejector to be connected to the gas feed pipes.

The ends of the horizontal arms of the T are enclosed by sleeves 66 and 66', respectively, terminating in frusto-conical adjutages 67 and 67', respectively. The sleeves 66 and 66' are attached to the tubes by struts 68 and 68', respectively.

As shown in FIG. 5, the center of the double ejector unit 51 is aligned with the centerline of the drawn glass ribbon 41 and is mounted on the horizontal portion of the L-shaped block 43. Each tube of the ejector is connected via a conduit 52 to a respective heat exchanger 53 or 53' disposed in the catch pan 47. The heat exchangers 53 and 53' are supplied from a common conduit 54 via electrically controlled valves 55 and 55', respectively.

In operation, the valves 55 and 55' are operated alternatingly, so that one is opened when the other is closed, at a determined frequency, so that the injected gases produce a to-and-fro motion in the atmosphere between the ribbon 41 and the walls 43 and 44. The presence of the sleeves and frusto-conical adjutages of the ejector 51 facilitates the drawing along of the chamber atmosphere under the influence of the injected gases.

When the pressure of the injected gas is high enough, the to-and-fro motion can be transmitted to that portion of the atmosphere which is between the ribbon and the walls 43' and 44' by passing around the lateral edges of the ribbon 41.

With the apparatus just described it was found that the difference between the maximum and minimum thicknesses of a drawn glass ribbon was reduced from 0.4 mm. to 0.15 mm. when the double ejector was operated. The ejector was fed by air compressed to about 250 g./cm.$^2$ and preheated to a temperature of the order of 450° C. The injection period allotted to each tube of the ejector was 4–5 seconds, with an air feed of 10–15 liters per minute.

FIGS. 7 to 9 are diagrammatic plan views through a drawing chamber whose walls are shown diagrammatically by rectangles 70, the glass ribbon being shown at 71. FIGS. 7 to 9 show possible arrangements when elements, such as fans or ejectors, each producing only one direction of movement are used to produce the to-and-fro motions. In practice, ejectors are preferred, since they consist of only stationary parts which require substantially no supervision or maintenance. In the following description, only ejectors will be considered, although, of course, fans can be used within the scope of the invention.

The single ejectors are designed in the same way as the double ejector described with reference to FIG. 6, with only one tube is used whose two ends are bent through 90°, one of the bent ends carrying a sleeve with a frusto-conical adjutage, while the other bent end is attached to a supporting plate and enables the ejector to be connected to a gas feed member.

Referring to FIG. 7, two ejectors 72 and 73 are disposed on respectively opposite sides of the glass ribbon 71 adjacent the same edge thereof. The ejectors 72 and 73 operate in the same direction, as shown by the arrows in FIG. 7, and are fed with gas from a common line 74 via two valves 75 and 76 operated alternatingly by a suitable timing mechanism (not shown). In this case, the to-and-fro motion is produced by the transmission of the motion of the atmosphere from one side of the ribbon 71 to the other side thereof. The injection pressure must be adequate for this purpose.

The arrangement of the ejectors 82 and 83 shown in FIG. 8 is particularly advantageous, since it uses the smallest possible number of ejectors with an efficiency which can readily be adapted to the existing working conditions. As in FIG. 7, the ejectors 82 and 83 are fed from a common line 84 via alternately operated valves 85 and 86. The ejectors 82 and 83 are disposed on the side of the ribbon 71 opposite the side where the molten glass is supplied thereto.

This arrangement enables action to be taken very effectively on the ascending currents passing along the central portion of the ribbon 71, the action being taken on that side of the ribbon 71 where the currents are cooler. By adjusting the pressure at which the gas is fed, a regulatable portion of the motion on the side where the ejectors 82 and 83 are disposed can be transmitted to the other side of the ribbon 71.

Single ejectors 92, 93, 94 and 95 controlled by valves 96, 97, 98 and 99, respectively, can be used as shown in FIG. 9, if the to-and-fro motions of the portions of the atmosphere in the drawing chamber 70 are to be controlled independently on each side of the ribbon 71. The valves can be controlled cyclically to produce to-and-fro motions of the desired amplitudes. For instance, the valves 96 and 98 can be operated simultaneously in alternation with the operation of the valves 97 and 99. In this case, the motions of the atmosphere on each side of the ribbon 71 have, at every instant, the same amplitude and direction so that no gas will be transferred from one side to the other of the ribbon.

For transferring gas from one side of the ribbon to the other, it is only necessary to operate the valves 96 and 99 together and in alternation with the valves 97 and 98 to transfer gas from one side to the other of the ribbon 71 while producing a to-and-fro motion.

In contrast, if gas is to be transferred from one side of the ribbon 71 to the other, but to a lesser extent than in the preceding case, the valves are operated one at a time in a cycle having the following order: 96, 97, 98, 99.

The devices described hereinbefore can also be used if the glass ribbon is drawn by the Colburn method.

In the illustrated embodiments, ejectors, fans or plates for displacing the gases are located in the drawing chamber itself. It is to be understood, however, that the invention can be carried out by providing one or more fans, ejectors or other suitable means located outside the drawing chamber and communicating with the interior thereof by way of a suitable passage or passages.

It will be understood that the above description of the present invention is susceptible to various modifications, changes and adaptations, and the same are intended to be comprehended within the meaning and range of equivalents of the appended claims.

What is claimed is:

1. A method for manufacturing sheet glass by drawing a glass ribbon from a molten glass bath in a drawing chamber whose atmosphere is subjected to movement, comprising continuously imparting, on at least one side of the ribbon in the drawing chamber, at least several to-and-fro reversals per minute to the movement of the atmosphere in a direction transverse to the ribbon drawing direction.

2. A method as defined in claim 1 wherein the to-and-fro movements are produced substantially parallel to the plane of the glass ribbon.

3. A method as defined in claim 1 wherein the to-and-fro movements are given to at least one portion of the atmosphere between the glass ribbon and the transverse walls bounding the drawing chamber on the side opposite the side at which molten glass is supplied.

4. A method as defined in claim 1 wherein said step of imparting is carried out by intermittently injecting a gas at a pressure higher than that in the drawing chamber into the chamber to produce the to-and-fro movements.

5. Apparatus for manufacturing sheet glass comprising: means for drawing a glass ribbon from a molten glass bath in a drawing chamber containing an atmosphere; movement-producing means disposed in said chamber for moving the atmosphere in at least a portion of said drawing chamber in a direction transverse to the ribbon drawing direction; and control means connected to said movement-producing means for causing said movement-producing means to continuously impart at least several to-and-fro reversals per minute to the atmosphere movement which it produces.

6. An arrangement as defined in claim 5 wherein said movement-producing means are disposed in said chamber between at least one surface of the glass ribbon and a transverse wall bounding said drawing chamber.

7. An arrangement as defined in claim 6 wherein said movement-producing means include at least one movement-producing member disposed to the side of the ribbon which is opposite the side at which molten glass is supplied.

8. An arrangement as defined in claim 6 wherein said movement-producing means comprise two identical elements each disposed at the same side of the ribbon and adjacent a respective edge thereof, said two elements being arranged for producing movements in respectively opposite directions, said control means being with said elements for causing them to operate in alternation with one another.

9. An arrangement as defined in claim 6 wherein said movement-producing means comprise two identical elements each constituted by a gas ejector capable of producing motion in but a single direction.

10. An arrangement as defined in claim 9 wherein each said ejector comprises a tube and a sleeve attached to the end of said tube, the inside dimensions of said sleeve being greater than the outside dimensions of said tube.

11. An arrangement as defined in claim 9 wherein said control means comprises at least one electrically controlled pneumatic valve connected for controlling the delivery of gas to each said ejector.

References Cited

UNITED STATES PATENTS

| | | | |
|---|---|---|---|
| 2,158,669 | 5/1939 | Amsler | 65—204 |
| 2,287,136 | 6/1942 | Rolland | 65—194 |
| 2,470,526 | 5/1949 | Sharp | 65—204 |
| 2,543,225 | 2/1951 | Bonjour | 65—193 |
| 2,896,376 | 7/1959 | Crandon | 65—204 |
| 2,960,800 | 11/1960 | Atkeson | 65—203 |
| 3,218,142 | 11/1965 | Bertrand | 65—84 |
| 3,232,733 | 2/1966 | Ward | 65—83 |
| 3,294,510 | 12/1966 | Bauouin | 65—84 |
| 3,317,300 | 5/1967 | Prislan | 65—84 |

S. LEON BASHORE, Primary Examiner

E. R. FREEDMAN, Assistant Examiner

U.S. Cl. X.R.

65—85, 90, 162, 163, 204